United States Patent
Domard et al.

(10) Patent No.: US 7,241,498 B2
(45) Date of Patent: Jul. 10, 2007

(54) SUPPORT COVERED WITH A CHITOSAN-BASED COATING AND METHOD FOR THE PRODUCTION THEREOF

(75) Inventors: Alain Domard, Lyons (FR); Eliane Espuche, Villeurbanne (FR); Séverine Despond, Caluire (FR); Noël Cartier, Vienne (FR)

(73) Assignee: Ahlstrom Corporation, Helsinki (FI)

( * ) Notice: Subject to any disclaimer, the term of this patent is extended or adjusted under 35 U.S.C. 154(b) by 0 days.

(21) Appl. No.: 10/508,870

(22) PCT Filed: Mar. 12, 2003

(86) PCT No.: PCT/FR03/00785

§ 371 (c)(1),
(2), (4) Date: Dec. 10, 2004

(87) PCT Pub. No.: WO03/082995

PCT Pub. Date: Oct. 9, 2003

(65) Prior Publication Data
US 2005/0084677 A1   Apr. 21, 2005

(30) Foreign Application Priority Data
Apr. 2, 2002   (FR) ................... 02 04060

(51) Int. Cl.
*D02G 3/00* (2006.01)
*B05D 3/02* (2006.01)

(52) U.S. Cl. .................. 428/375; 428/393; 428/394; 428/532; 427/356; 427/372.2; 427/384; 427/420; 427/416

(58) Field of Classification Search ............... 428/393, 428/375, 394; 427/356, 420, 372.2, 384, 427/416
See application file for complete search history.

(56) References Cited

U.S. PATENT DOCUMENTS 5,900,479 A   5/1999   Glasser et al.

FOREIGN PATENT DOCUMENTS

DE         43 03 415 A      8/1994
WO      WO 02 06410 A      1/2002

OTHER PUBLICATIONS

*Patent Abstracts of Japan*, vol. 2002, No. 2, Apr. 2, 2002 & JP 2001 288695 A (Nippon Paper Industries Co. Ltd.), Oct. 19, 2001.
*Patent Abstracts of Japan*, vol. 2000, No. 18, Jun. 5, 2001 & JP 01 014396 A (DIC Hercules Chem. Inc.; Kimitsu Kagaku Kogyo KK), Jan. 18, 1989.

(Continued)

*Primary Examiner*—Jill Gray
(74) *Attorney, Agent, or Firm*—Nixon & Vanderhye P.C.

(57) ABSTRACT

Support based on organic and/or inorganic fibres covered at least on one of the faces thereof with a chitosan-based layer, characterized in that the layer is obtained by depositing a chitosan-based aqueous solution, the average molar mass of which has a mass less then 130 000 g/mol, the concentration of which is between 6 and 30% by weight and the viscosity of which is between 100 and 3000 cps.

18 Claims, 4 Drawing Sheets

OTHER PUBLICATIONS

Figure 1:
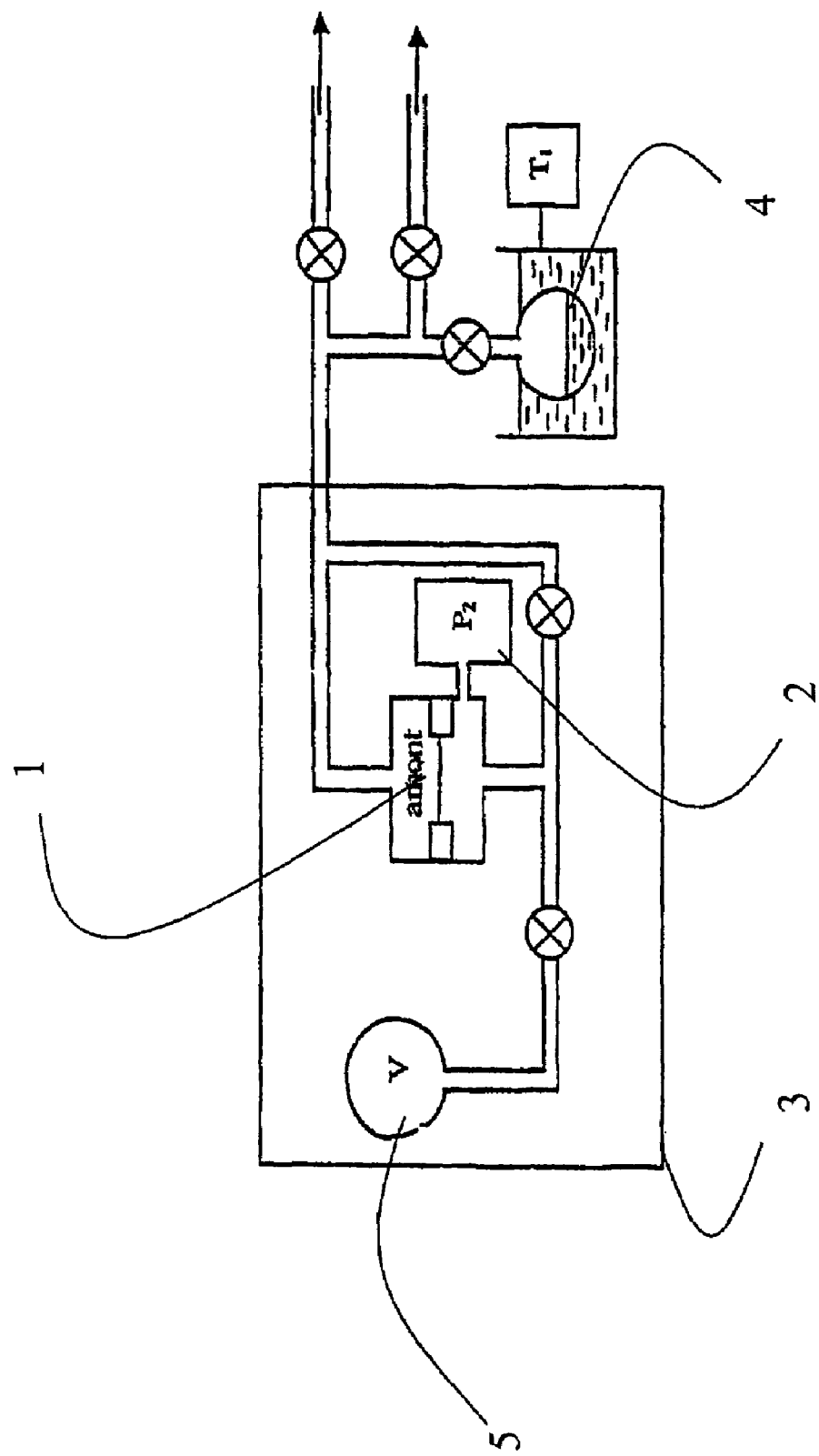

*Patent Abstracts of Japan*, vol. 014, No. 126, Mar. 9, 1990 & JP 02 002303 A (Agency of Ind. Science & Technol.), Jan. 8, 1990.

*Patent Abstracts of Japan*, vol. 017, No. 079, Feb. 17, 1993 & JP 04 279678 A (Momoki Nakagawa; Others: 01), Oct. 5, 1992.

Database WPI, Week 199026, Derwent Publications Ltd., AN 1990-196200, XP002221823 & JP 02 127596 A (Fujimori Ind. Co. Ltd.), May 16, 1990.

Database WPI, Section Ch, Week 199216, Derwent Publications Ltd., AN 1992-126424, XP002246166 & JP 04 065579 A (Toray Ind. Inc.), Mar. 2, 1992.

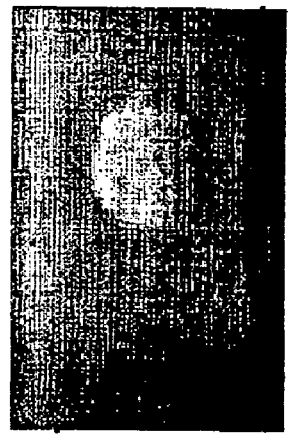
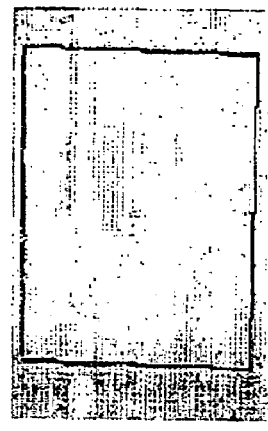
Dépose de 7g/m²
*Botrytis cinerea*
*Aspergillus flavus*
*Pen

SUPPORT COVERED WITH A CHITOSAN-BASED COATING AND METHOD FOR THE PRODUCTION THEREOF

This application is the US national phase of international application PCT/FR03/00785 filed 12 Mar. 2003 which designated the U.S. and claims benefit of fr 02/04060, dated 2 Apr. 2002, the entire content of which is hereby incorporated by reference.

The invention relates to a manufacturing process of a support based on organic and/or inorganic fibres coated, on at least one of the faces thereof, with a chitosan-based layer.

In the rest of the description, the expression "organic and/or inorganic fibres" denotes among the organic fibres, especially the cellulose fibres, the synthetic fibres e.g. of the polyester, polyethylene, polypropylene, polyamide and polyvinyl chloride type; the artificial fibres (e.g. viscose, cellulose acetate); the natural fibres (e.g. cotton, wool, wood pulp); the carbon fibres (possibly active) and among the inorganic fibres, especially the mineral fibres (e.g. glass fibres, ceramic fibres). Depending on the nature of the chosen fibres, the support may be in the form of a paper, a board, a nonwoven or even a woven.

The document WO 97/23390 describes a complex composed of a paper support coated, on both of the faces thereof, with a polyethylene layer, the support being separated from the polyethylene layer by a chitosan-based layer. To be more precise, the chitosan-based layer results from a mixture of chitosan with polyvinyl alcohol and a cross-linking agent, the chitosan being used in order to give certain flexibility to the obtained support. The proportion of chitosan in the layer represents at the most 50% by weight, the balance to 100% consisting of the cross-linking agent and the polyvinyl alcohol. According to the illustrative examples, the chitosan is introduced into the mixture at a concentration of 1% by weight. Insofar as the chitosan may represent even 50% by weight of the concentration and as it is indicated that the total weight of the said layer is between 1 and 10 g/m$^2$, it can be deduced that the gross weight of the deposited chitosan is 5 g/m$^2$. No information concerning the molecular weight of the chitosan is given.

The document JP-07082690 describes a wrapping paper according to which a support based on cellulose fibres is coated with an acid solution of chitosan and PVA. The concentration of the chitosan used is between 0.05 and 3% by weight with the indication that when it goes over 3%, we are confronted with viscosity problems preventing the application of the layer on the support. No information concerning the molecular weight of the chitosan is given.

These documents, and more generally of the prior art known by the Applicant, indicate that it seems impossible, due to the high viscosity of the chitosan, to coat a support with high concentrations of chitosan (in practice over 3%), with the intention to obtain a sufficient quantity of deposited chitosan (in practice over 5 g/m$^2$) in order to obtain a continuous film on the surface of the support.

In spite of this, the document JP-02127596 describes a manufacturing process of a paper support coated with chitosan or chitin with the concentrations between 1 and 20% by weight for obtaining a mass of the deposited chitosan of between 0.5 and 30 g/m$^2$. Considering the average molar mass of the used chitosan, which is between 200 000 and 500 000 g/mol, it turns out to be impossible to coat high concentrations of chitosan so that the viscosity would be adequate in the coating process. In practice, the viscosities are between 100 and 3000 cps at a shearing speed of 100 s$^{-1}$ (standard condition). However, no information concerning the viscosity is given in this document.

In evidence of this, it is sufficient to examine the illustrative examples which represent the invention only within a restricted field, as can be seen from the following table.

|  | Ex. 1 | Ex. 2 | Ex. 3 | Ex. 4 | Ex. 5 |
| --- | --- | --- | --- | --- | --- |
| Chitosan or chitin concentration in % by weight | 1 | 1 | 1 | 2 | 1 |
| Chitosan mass deposited in an amount of g/m$^2$ | 1 | 1 | 5 | 10 | 5 |

This table shows that the highest illustrated chitosan concentration is set to 2% and this for a deposited chitosan mass of 10 g/m$^2$. Thus, the following two fundamental elements can be deduced from this table. On the one hand, a process such as described cannot be considered as reproducible within the whole required range as the highest illustrated values are 2% in concentration for 10 g/m$^2$. On the other hand, if, as is indicated in this document, it is possible to obtain a chitosan coating of 10 g/m$^2$ with a chitosan solution concentration of 2% or 5 g/m$^2$ with a concentration of 1%, this can only be in several steps, that is to say after at least five successive coatings. In fact, a chitosan concentration of 1% corresponds essentially to a deposited chitosan mass of 1 g/m$^2$.

Thus, it is obvious that this process has the inconvenience of not being able to be industrialized insofar as the support needs to be coated with several layers of chitosan for obtaining a satisfactory quantity of the deposited chitosan. As a result, the final product becomes too expensive due to the manufacturing process.

The document U.S. Pat. No. 5,900,479 describes a manufacturing process of a chitin film from a chitosan solution. The molecular weight of the used chitosan is between 10$^4$ and 10$^6$ even if no particular example is illustrated. Furthermore, no information is given concerning the viscosity of the chitosan solution.

Consequently, the problem that the invention proposes to solve is how to develop a support coated with chitosan in an amount of at least over 6 g/m$^2$, which can be manufactured with a process in which the coating of the chitosan is performed with a limited number of steps.

To do this, the invention proposes a support covered on at least one of the faces thereof with a chitosan-based layer, the chitosan being advantageously coated in an amount from 6 to 15 g/m$^2$ as dry matter.

This support is characterized in that the layer is obtained by performing a coating with a chitosan-based aqueous solution, the average molar mass of which has a mass (Mw) lower then 130 000 g/mol, preferably between 10 000 and 100 000, advantageously between 15 000 and 40 000, the concentration of which is between 6 and 30%, advantageously from 6 to 25% by weight and the viscosity of which is between 100 and 3000 cps.

In an advantageous embodiment, the layer is in the form of a continuous film.

In the rest of the description and in the claims, the viscosity values are indicated for the standard shearing speeds, in principle equal to 100 s$^{-1}$. Also, the average molar masses are expressed in mass (Mw).

In other words, the invention has used a chitosan having a low average molar mass having a mass (Mw) inferior to 130 000 g/mol, thus allowing an increase of the chitosan concentration of the solution, without increasing the viscosity, thus allowing to deposit a considerable amount of chitosan.

The selection of the molecular mass of the chitosan was not obvious. In fact, the molecular weight has to be high enough to give the film a suitable film-forming character allowing to assure an efficient barrier (gas, steam) while still remaining sufficiently low in order to give the solution such a viscosity that it can be applied in few coatings.

The chitosan of small molecular mass can be obtained in laboratory scale by hydrolysis. In this case, the hydrolysis of the chitosan is carried out with the help of sodium nitrite according to the process described by Allan and Peyrou, 1989, the document being incorporated herein by reference.

This process has the advantage, compared with the conventional acid hydrolysis, of not causing the colouring of the support. What is essential is that this process consists in preparing a chitosan solution in a buffer environment, in practice 0.2 M AcOH/0.1 M AcONa. After stirring, sodium nitrite is added to the mixture, which allows starting the hydrolysis. After a predetermined time, the hydrolysis is stopped by adding an ammoniacal solution, in practice at 16.5 N causing the precipitation of the chitosan. The precipitate is then washed until a supernatant is obtained, the pH of which is in practice about 6.5.

The hydrolysis of chitosan is obtained due to the formation of nitrosyl cation from sodium nitrite, the nitrosyl cation attacking the amines of the chitosan so as to form an N-nitroammonium salt. Finally, the nitrosamines are decomposed for obtaining polymers having a lower degree of polymerisation.

As already said, the selection of the average molar mass of the used chitosan allows to obtain a chitosan concentration in the coating solution, which is between 6 and 30%, preferably between 7 and 12%, advantageously 10%, by weight. In practice, the chitosan is dissolved in an aqueous solution in the presence of an organic or inorganic acid chosen e.g. from the group comprising the lactic, acetic, hydrochloric, nitric, advantageously citric, acids, this list not being closed.

Very surprisingly, the Applicant has found out that the selection of the acid had an influence on the fluidity of the aqueous chitosan solution. Thus, he has shown that for a given concentration of chitosan, of a determined molar mass, a viscosity varying depending on the selection of the acid was obtained. In particular, the citric acid allows lowering the viscosity compared to another acid.

Consequently and in another preferred embodiment, the chitosan is dissolved in the presence of citric acid.

According to another characteristic, the chitosan-based layer contains at least 80% by weight of chitosan in the form of salt (chitosan+acid), advantageously 100% by weight of chitosan.

In an advantageous embodiment, the chitosan is deposited in an amount of 7 g/m$^2$ as dry matter.

In practice, the support is a support based on organic and/or inorganic fibres such as previously described, the mass of which is between 15 and 200 g/m$^2$, advantageously between 25 and 100 g/m$^2$.

The support of the invention has a certain amount of properties which will be described more in the following illustrative examples. Especially, and in certain conditions, the coated support forms an excellent barrier to gases ($O_2$, $CO_2$ and aroma), to the water vapour, to microorganisms.

To be more precise, the chitosan-coated support of the invention forms an excellent barrier to $O_2$ and $CO_2$ gases when the relative humidity is less then 80%. On the other hand, it forms an excellent barrier to the water vapour, for the relative humidity of less than 40%.

The support of the invention can be used for several applications such as filtration, food packaging or others such as patches, cosmetic and pharmaceutical supports etc.

In order to enhance the barrier properties to gas and water vapour in a humid atmosphere, the chitosan layer is covered with wax, advantageously vegetal, by definition hydrophobic.

In an advantageous embodiment, the wax is introduced in the form of an aqueous emulsion, in the chitosan solution, the wax representing between 0.1 and 20% by weight of the chitosan.

In practice, the used plant wax is chosen from the group comprising the candelilla wax and the carnauba wax, this list not being exhaustive. These two waxes are perfectly known by a man of the art, the first being obtained from the bush of *Euphorbia Cerifera*, the second being obtained from the palm tree *Copernica Cerifera*.

Such a support may especially be used as a food packaging material insofar as either the chitosan or the plant wax cannot migrate towards the food. Furthermore, the ingestion of these two constituents is non-toxic. Further, the cellulose-chitosan assembly, when this is the case, forms a totally biodegradable, bioresorbable assembly without environmental influence.

The invention relates also to the manufacturing process of the support such as previously described. In a particular embodiment, the coating with the aqueous solution of chitosan is performed in only one step.

Of course, the deposit of chitosan-based solution in the form of a film continuous, or not, on the support, can be performed with all techniques known by the man of the art, such as by the Meyer bar or blade type coating, metering size-press, coating with an engraved cylinder by direct coating, by transfer coating or reverse coating, curtain coating, by size-press etc.

In order to assure a good spreading of the chitosan-based layer on the support, it has a viscosity of between 100 and 3000 cps, advantageously between 200 and 1500 cps, at a shearing speed of 100 s$^{-1}$, bearing in mind that the viscosity depends directly on the selection of the acid in the aqueous solution of chitosan.

The coating can be carried out discontinuously, off-line, or preferably continuously, on-line, e.g. especially on a paper machine.

When the chitosan layer is covered with a plant wax, the wax is applied either in the form of an emulsion as a mixture with the chitosan, or by itself on a first chitosan-based layer according to the standard coating processes such as those previously described.

The invention and the advantages which stem therefrom will become more apparent from the following illustrative examples, supported by the appended figures.

The FIG. 1 is a schematic illustration of the device allowing the evaluation of water vapour permeation characteristics of the support of the invention.

Figure 2:
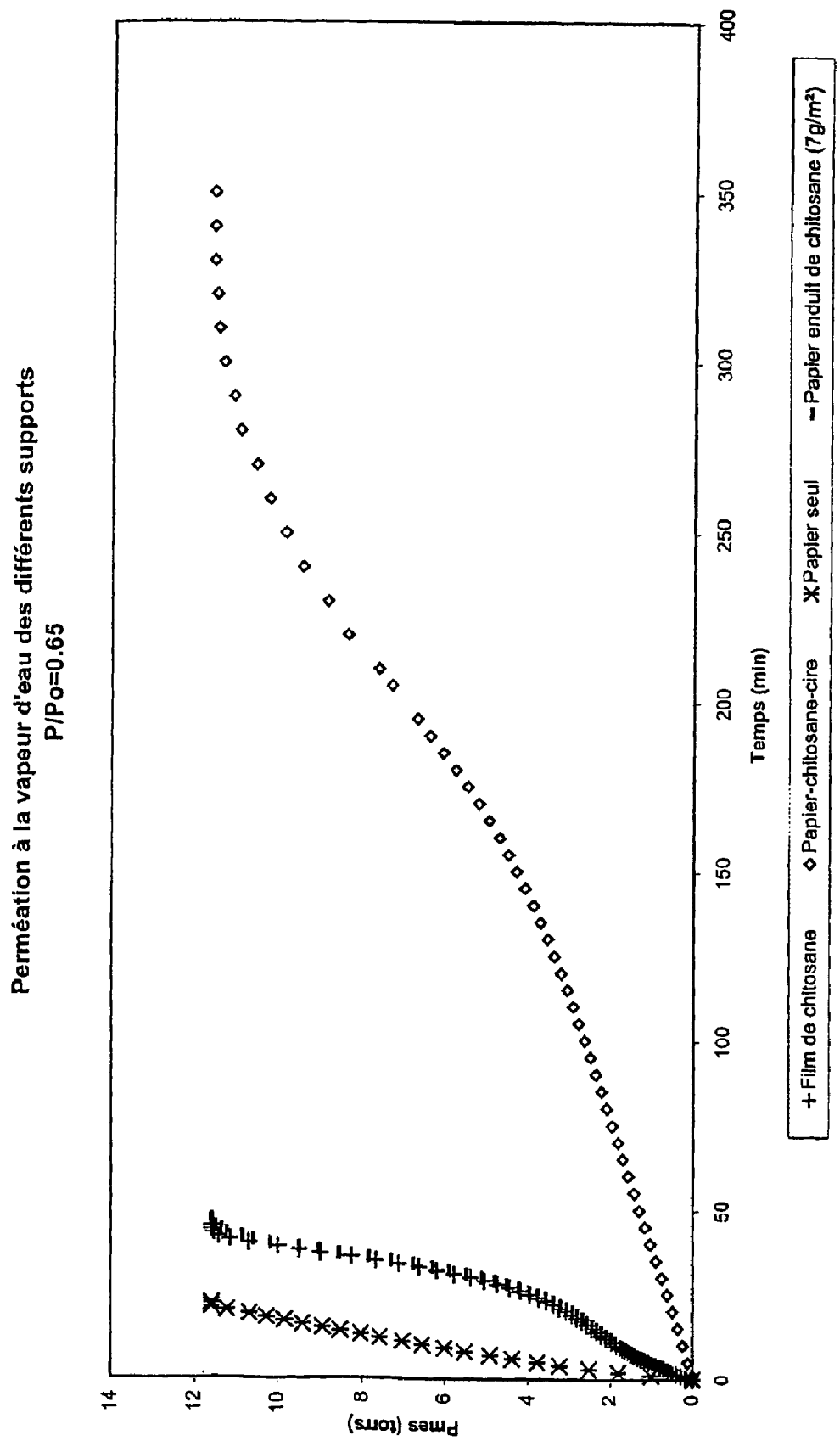

The FIG. 2 illustrates the water vapour permeation characteristics of the support of the invention according to four different embodiments (chitosan film—paper/chitosan/wax—paper by itself—paper coated with chitosan (7 g/m$^2$)).

Figure 3:
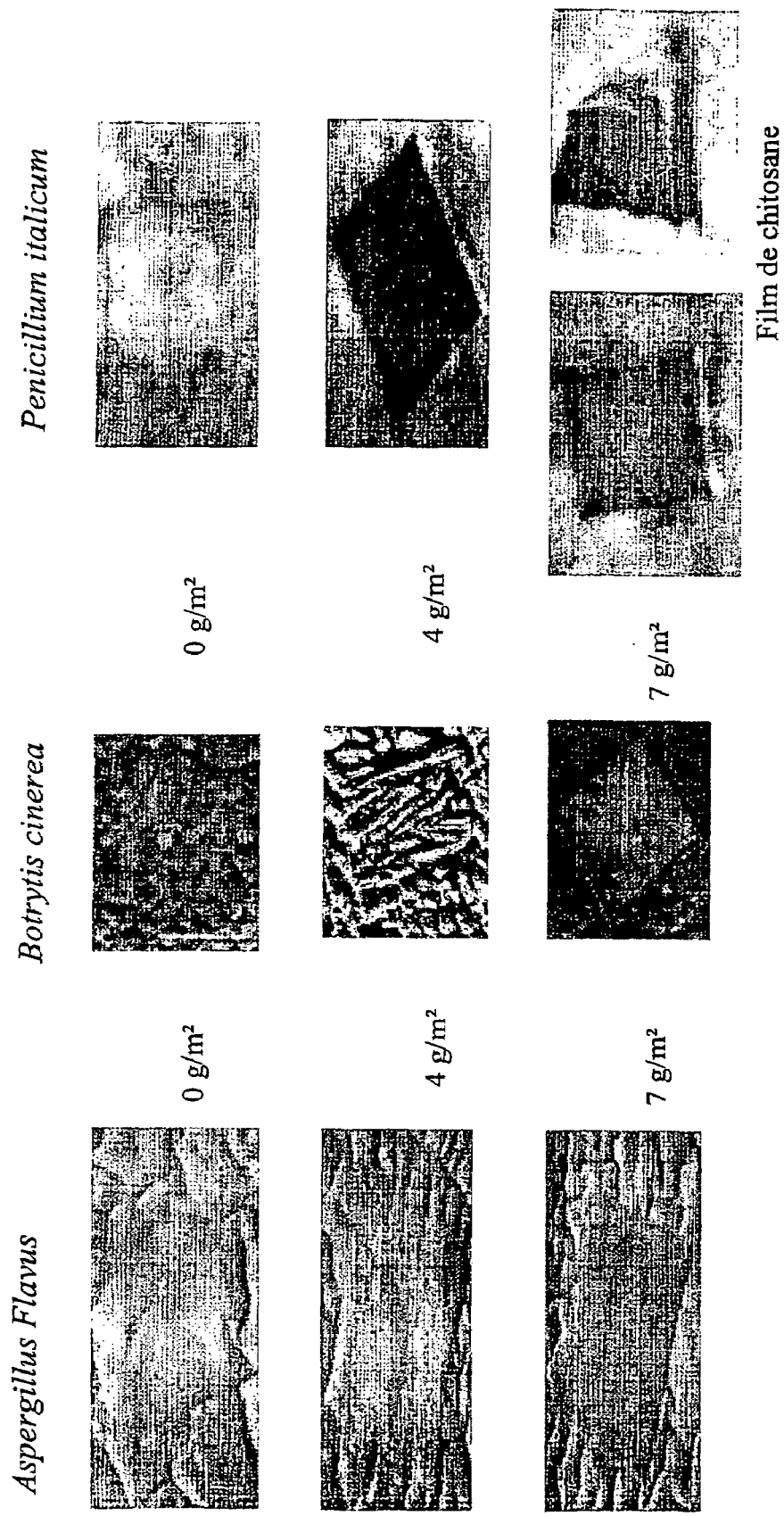

The FIG. 3 illustrates the antimicrobic efficiency of the support of the invention when it is used as an active food package. This support allows limiting the development of the usual contamination of the food and consequently increasing its preserving time.

The FIG. 4 illustrates the antimicrobic efficiency of the support of the invention used as a protective wrapper for limiting the penetration of external microorganisms.

EXAMPLE 1

Manufacturing of the Coated Support of the Invention
1. Preliminary Hydrolysis of the Chitosan A chitosan solution, the average molar mass of which is in mass 200 000 g/mol, is prepared in a buffer solution of acetic acid of 1%. The solution thus prepared is maintained agitated during 12 hours.

Then sodium nitrite is added in an amount such as $$R = \frac{\text{Sodium nitrite}}{\text{Amine function of chitosan}} = 0,02$$

The hydrolysis is carried out during a period of 24 hours. Finally, the hydrolysis is stopped by adding an ammoniacal solution 16.5 N. The precipitated chitosan is washed until a supernatant having a pH close to 6.5 is obtained.

The average molar mass of the obtained hydrolysed chitosan has a mass (Mw) of 25 000 g/mol.

2. Manufacturing of the Coated Support

A chitosan solution of 8% by weight, with an average molar mass having a mass (Mw) of 35 000 g/mol, is prepared in the presence of three different acids in a stoichiometric amount.

The viscosities of the chitosan solution are represented in the following table according to the nature of the acids.

| Used acid Chitosan solution of 8% w/w (35000 g/mol) | Viscosity (Cps) at a shearing speed of 100 sec$^{-1}$ |
| --- | --- |
| Acetic acid | 374 |
| Citric acid | 257 |
| Butyric acid | 1150 |

It is noticed that for the same chitosan concentration, the acid has an influence on the viscosity of the obtained solutions. Thus, the citric acid allows obtaining a less viscous solution with the same chitosan concentration.

This solution is then coated with the Mayer bar on a support paper of 35 g/m² vegetable parchment type. Thus, a continuous film is obtained on the surface of the paper. The complex is dried at 100° C. The mass of the deposited chitosan is 7 g/m².

EXAMPLE 2

Properties

The different tests are performed with a support coated with a chitosan solution in the acetic acid.

1. Permeance in Anhydrous State

| | Deposited mass (g/m²) | Pe(CO2) Barrer | Pe(O2) Barrer |
| --- | --- | --- | --- |
| Paper by itself (vegetable parchment 35 g/m²) | | 1640 | 651 |
| Paper coated with chitosan (200000 g/mol) with a solution of 1% | 0.9 | 820 | 588 |
| Paper coated with chitosan (200000 g/mol) with a solution of 2% | 1.5 | 594 | 231 |
| Paper coated with hydrolysed chitosan (60000 g/mol) with a solution of 4% | 3 | 75 | 36 |
| Paper coated 2 times with hydrolysed chitosan (60000 g/mol) with a solution of 4% | 4.5 | 3.1 | 3.3 |
| Paper coated with hydrolysed chitosan (25000 g/mol) with a solution of 10% | 7 | 0.28 | 0.12 |
| 2 μm thick chitosan film (200000 g/mol) | | 0.3 | 0.24 |

Pe: permeability

As can be seen from these results, gas barrier properties identical to those of the 2 μm chitosan film are obtained when at least 7 g/m² of chitosan solution is deposited on the support, this coating being made possible by selecting the acid and the molecular weight of the chitosan.

2. Water Vapour Permeation

The test is performed on three different supports:
- a paper parchementized at 35 g/m²
- a paper coated with a chitosan solution according to the example 1.2,
- a chitosan film of 200 000 g/mol having a thickness of 2 μm.

The permeability measurements have been carried out in a device schematized in the FIG. 1.

A diffusing concentration gradient is applied from both sides of a membrane (1) corresponding to the sample to be analyzed and forms the driving force of the diffusion.

The measuring cell (2) is placed in a housing (3), the temperature of which is set to 22° C. with a thermostat. The evaporation of the liquid to be studied (in our case water) is made through a balloon immerged in a bath (4), the temperature of which is adjusted exactly to 15° C. so that the tension of the vapour $P_1$ imposed in the upstream compartment would be constant during the whole test.

The pressure in question is, in fact, the relative pressure:

$$\frac{P}{P_0} = 0,65$$

in which $P_0$ is the tension of the vapour corresponding to a temperature of 22° C.

The useful surface of the membrane is 10 cm².

The volume $V_2$ of the downstream compartment (5) is adjustable according to the permeation flows to be measured and the sensor used is of the DATAMETRIX type of 100 torrs.

On the FIG. 2 has been represented the water vapour permeation as a function of time for three supports: chitosan by itself, paper by itself, paper/chitosan (7 g/m²).

A coating of 7 g/m² on the paper allows diminishing with a factor 2 the water flows in relation to the paper by itself at a partial pressure of 0.65. The water flows for the coated paper are of the same order of magnitude as for the chitosan film.

3. Antimicrobic Properties of the Support of the Invention
Food Contamination Simulation In this test a suspension of fungi is inserted, in a Petri dish, between the support of the invention and the SABOURAUD gelose.

The support is a paper support of the parchmentized type at 35 g/m² and is coated with 0, then 4 and 7 g/m² of chitosan according to the example 1.2.

The obtained results are represented in the FIG. 3, vis-à-vis the colonies *Aspergillus Flavus, Botrytis cinerea* and *Penicillium italicum*. As shown, the coated support inhibits the growth of the fungi, the most satisfactory results being obtained for a chitosan coating of 7 g/m².

External Contamination Simulation

In this test, the coated support of the invention is inserted between the gelose and the fungi suspension. The cultivation is maintained at 25° C. during 96 hours. The obtained results are represented in the FIG. 4. As can be seen from this figure, the microorganism increases in height so as to avoid the direct contact with the chitosan.

EXAMPLE 3

A layer of carnauba wax is coated with the Meyer bar on the surface of the complex obtained in example 1.2, the coating of the wax layer being made in an amount of 1 g/m².

EXAMPLE 4

Water Vapour Properties of the Complex Object of the Example 3

The same technique is used as for the example 2.

As can be seen from the FIG. 2, the coating of chitosan and then wax reduces the water flow with a factor 10 in relation to the paper by itself.

The invention claimed is:

1. A support comprised of a substrate formed of organic and/or inorganic fibres and a chitosan-based coating layer on at least one face of the substrate, wherein the coating layer is a dried residue of an aqueous chitosan-based solution which is comprised of prehydrolyzed chitosan having an average molar mass of less then 130,000 g/mol which is present in the solution in a concentration between 6 and 30% by weight, and wherein the chitosan-based coating layer contains at least 80% by weight of the prehydrolyzed chitosan.

2. A support according to claim 1, wherein the prehydrolyzed chitosan is present in the coating layer in an amount of from 6 to 15 g/m² in dry matter.

3. A support according to claim 1, wherein the coating layer is in the form of a continuous film.

4. A support according to claim 1, wherein the prehydrolyzed chitosan has an average molar mass of between 15,000 and 40,000 g/mol.

5. A support according to claim 1, wherein the prehydrolyzed chitosan concentration in the aqueous solution is between 7 and 12% by weight.

6. A support according to claim 1, wherein the aqueous solution is further comprised of citric acid in an amount sufficient to dissolve the prehydrolyzed chitosan.

7. A support according to claim 1, wherein the amount of the prehydrolyzed chitosan in the coating layer is 7 g/m² in dry matter.

8. A support according to claim 1, further comprising a wax layer which covers the chitosan-based coating layer.

9. A process for making a chitosan-coated support member, the process comprising the sequential steps of:
    (a) prehydrolyzing chitosan so as to achieve an average molar mass thereof of less than 130,000 g/mol;
    (b) forming an aqueous chitosan-based solution comprised of between 6 and 30% by weight of the prehydrolyzed chitosan obtained according to step (a);
    (c) coating the aqueous chitosan-based solution onto a face of a substrate formed of organic and/or inorganic fibers to provide a chitosan-based coating layer on the substrate which contains at least 80% by weight of chitosan; and thereafter
    (d) drying the chitosan-coated support member so that the prehydrolyzed chitosan remains as a dried layer on the substrate to thereby form the chitosan-coated support member.

10. A process according to claim 9, wherein step (c) is practiced so as to coat the aqueous chitosan-based solution onto the face of the substrate in only one step.

11. A process according to claim 9, wherein step (c) is performed by the Meyer bar or blade type coating, metering size-press, coating with an engraved cylinder by direct coating, by transfer coating or reverse coating, curtain coating, by size-press.

12. A process according to claim 9, wherein step (b) comprises introducing wax into the aqueous chitosan-based solution so that the wax is present in an amount of between 0.1 and 20% by weight of the chitosan.

13. A process according to claim 9, wherein step (c) is practiced so that the prehydrolyzed chitosan is present in the coating layer in an amount of from 6 to 15 g/m² in dry matter.

14. A process according to claim 13, wherein the prehydrolyzed chitosan is present in the coating layer in an amount of 7 g/m² in dry matter.

15. A process according to claim 9, wherein step (c) is practiced so as to form the coating layer as a continuous film.

16. A process according to claim 9, wherein step (a) is practiced to obtain prehydrolyzed chitosan having an average molar mass of between 15,000 and 40,000 g/mol.

17. A process according to claim 9, wherein the prehydrolyzed chitosan concentration in the aqueous chitosan-based solution is between 7 and 12% by weight.

18. A process according to claim 9, wherein step (b) includes incorporating citric acid into the aqueous chitosan-based solution in an amount sufficient to dissolve the chitosan therein.

* * * * *